(12) United States Patent
Ruppert et al.

(10) Patent No.: US 9,333,850 B2
(45) Date of Patent: May 10, 2016

(54) ACTIVE GRILLE MULTI PART MODULAR FRAME

(71) Applicants: Benjamin R. Ruppert, Chesterfield, MI (US); Martin R. Matthews, Troy, MI (US)

(72) Inventors: Benjamin R. Ruppert, Chesterfield, MI (US); Martin R. Matthews, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 14/422,923

(22) PCT Filed: Aug. 30, 2013

(86) PCT No.: PCT/US2013/057572
§ 371 (c)(1),
(2) Date: Feb. 20, 2015

(87) PCT Pub. No.: WO2014/036432
PCT Pub. Date: Mar. 6, 2014

(65) Prior Publication Data
US 2015/0231962 A1  Aug. 20, 2015

Related U.S. Application Data

(60) Provisional application No. 61/695,489, filed on Aug. 31, 2012.

(51) Int. Cl.
*B60K 11/08* (2006.01)
*B60R 19/52* (2006.01)

(52) U.S. Cl.
CPC ............... *B60K 11/085* (2013.01); *B60R 19/52* (2013.01); *B60R 2019/525* (2013.01)

(58) Field of Classification Search
CPC ...... B60K 11/08; B60K 11/085; B60R 19/52; B60R 2019/525
USPC ...................... 180/68.1, 68.2, 68.3, 68.4, 68.6
See application file for complete search history.

(56) References Cited

U.S. PATENT DOCUMENTS 2,551,921 A * 5/1951 Arsem ...................... F01P 7/12
                                                                    123/41.04
4,753,288 A    6/1988 Harvey
(Continued)

FOREIGN PATENT DOCUMENTS

DE     102009058760 A1    6/2011
DE     102011119368 A1    5/2012

OTHER PUBLICATIONS

International Search Report and Written Opinion for International Application No. PCT/US2013/057572 Filed on Aug. 30, 2013.

*Primary Examiner* — John Walters
(74) *Attorney, Agent, or Firm* — Warn Partners, P.C.

(57) ABSTRACT

An active grille shutter arrangement having an assembled modular frame. The assembled modular frame includes an upper frame portion and a lower frame portion each having a first end and a second end. A first end cap is connectable to both the first end of the upper frame portion and the first end of the lower frame portion. The connection between the first end of the upper frame portion and the first end of the lower frame portion includes an upper bar end joint formed on the front end of the upper frame portion and a lower bar end joint formed on the first end of the lower frame portion. The upper bar end joint slides into an upper bar end cap joint formed on the first end cap and the lower bar end joint slides into a lower end cap joint formed on the first end cap.

13 Claims, 7 Drawing Sheets

(56) References Cited

U.S. PATENT DOCUMENTS

| | | | | |
|---|---|---|---|---|
| 6,145,251 A * | 11/2000 | Ricci | ............... | E06B 7/096 49/74.1 |
| 8,161,919 B2 * | 4/2012 | Klotz | ............... | B60K 11/085 123/41.04 |
| 8,646,552 B2 * | 2/2014 | Evans | ............... | B60K 11/085 180/68.1 |
| 8,708,077 B2 * | 4/2014 | Hori | ............... | B60K 11/085 180/68.1 |
| 8,794,362 B2 * | 8/2014 | Lee | ............... | B60K 11/085 180/68.1 |
| 2011/0070817 A1 | 3/2011 | Walters | | |

* cited by examiner

*FIG - 8D*

ACTIVE GRILLE MULTI PART MODULAR FRAME

CROSS-REFERENCE TO RELATED APPLICATIONS

This application is a National Stage of International Application No. PCT/US2013/057572 filed 30 Aug. 2013, which is a PCT International Application claiming priority to U.S. Patent Application No. 61/695,489 filed on 31 Aug. 2012.

FIELD OF THE INVENTION

The present invention relates to a multi piece modular frame for use in an active grille shutter system for a vehicle.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Active grille systems that have been developed implement a frame is typically molded as a complete part. During assembly, the frame and/or the vanes have to be distorted in order to assemble the complete system onto the one piece frame. Additionally, the one piece frame has a low shipping density as it is mostly empty space. Furthermore, if an active grille system has two variants with either additional vanes or a base air flow, a complete new frame must be molded and shipped. It is therefore desirable to provide a frame that is multiple separate molded parts instead of one complete molding. This will aid in the assembly of the active grille shutter system without having to distort the frames or the vanes. Additionally, having multiple components accommodates the various variants that can be needed depending on the particular application. Lastly, having a multi-piece frame increases the shipping density since the various components can be stacked more closely together.

SUMMARY OF THE INVENTION

The present invention is directed to an active grille shutter arrangement having an assembled modular frame. The assembled modular frame includes an upper frame portion and a lower frame portion each having a first end and a second end. A first end cap is connectable to both the first end of the upper frame portion and the first end of the lower frame portion. The connection between the first end of the upper frame portion and the first end of the lower frame portion includes an upper bar end joint formed on the front end of the upper frame portion and a lower bar end joint formed on the first end of the lower frame portion. The upper bar end joint slides into an upper bar end cap joint formed on the first end cap and the lower bar end joint slides into a lower end cap joint formed on the first end cap.

A second end cap connects to both the second end of the upper frame portion and the second end of the lower frame portion. The connection between the second end of the upper frame portion and the second end of the lower frame portion includes an upper bar end joint formed on the second end of the upper frame portion and a lower bar end joint formed on the second end of the lower frame portion. The upper bar end joint of the second end slides into an upper end cap joint formed on the second end cap and the lower bar end joint formed on the second end of the lower frame portion slides into a lower end cap joint formed on the second end cap.

When the upper frame portion, lower frame portion, first end cap and second end cap are connected together, an assembled modular frame is formed. The assembled modular frame defines one or more apertures through which air passes once the assembled modular frame is connected to a vehicle. The invention also includes a plurality of vanes rotatably positioned between the first end cap and second end cap for controlling the amount of air flowing through the one or more apertures formed by the assembled modular frame.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now to FIGS. 1-8D, an active grille shutter arrangement 10 having an assembled modular frame 12 is depicted. Assembled modular frame 12, which is shown in various views as being exploded, disassembled and assembled in other views; includes an upper frame portion 14 having a first end 16 and second end 18, as well as a lower frame portion 20 having a first end 22 and second end 24; a first end cap 26 and second end cap 28. The first end cap 26 and second end cap 28 are connected to the upper frame portion 14 and lower frame portion 20 to form the assembled modular frame 12. As shown in the drawings, the shape of the assembled modular frame 12 is generally rectangular; however, it is possible for the structure to have different shapes depending upon the particular application. The upper frame portion 14, lower frame portion 20, first end cap 26 and second end cap 28 are all formed of polymeric material and in a preferred embodiment of the invention are created using injection molding. In order to strengthen these components, structural ribs 30 are present on the components in order to make them stronger and reduce the amount of polymeric material needed to create the specific component.

The length and shape of the upper frame portion 14, lower frame portion 20, first end cap 26 and second end cap 28 can vary depending upon the needs of a particular application. Additionally, these components are interchangeable, for example, the first end cap 26 and second end cap 28 can be used with an upper frame portion 14 and lower frame portion 20 that have the same or different lengths depending upon the size of the assembled modular frame 12 that is needed. This provides a great deal of versatility for the various components since the assembled modular frame 12 can have a different size assembled from parts having different lengths. This allows the assembled modular frame 12 to be used with various variants encountered in and incorporating active grille shutter arrangements on vehicles. This also increases the shipping density of the components of the assembled modular frame 12 by allowing similar parts to be packaged together more tightly than would be possible with a modular frame that is one piece.

When the upper frame portion 14, lower frame 20, first end cap 26 and second end cap 28 are assembled together to form the assembled modular frame 12, one or more apertures, which in the present embodiment of the invention is a first aperture 32 and second aperture 32' created to allow air to pass through the assembled modular frame 12 when assembled to a vehicle. The active grille shutter arrangement 10 is created when the assemble modular frame 12 has a plurality of vanes 34 connected between the first end cap 26 and second end cap 28, which can be rotated in order to control the amount of air flowing through the apertures 32. As shown in the present invention, the vanes 34 are connected between a center bar 36 that extends between the upper frame portion 14 and the lower frame portion 20. The vanes 34 are connected between the center bar 36 and one of the first end caps 26 or second end cap 28 and are configured to rotate about barrels 38 formed on each end of the specific vanes 34, such that the barrels 38 are rotatably disposed in holes 40 on the center bar 36, first end cap 26 or second end cap 28. Inside of the center bar 36 is an actuator 42 that controls the rotatable position of the vanes 34 and thereby controls the amount of air flowing through the apertures 32.

Figures 8A, 8B, 8C, 8D:
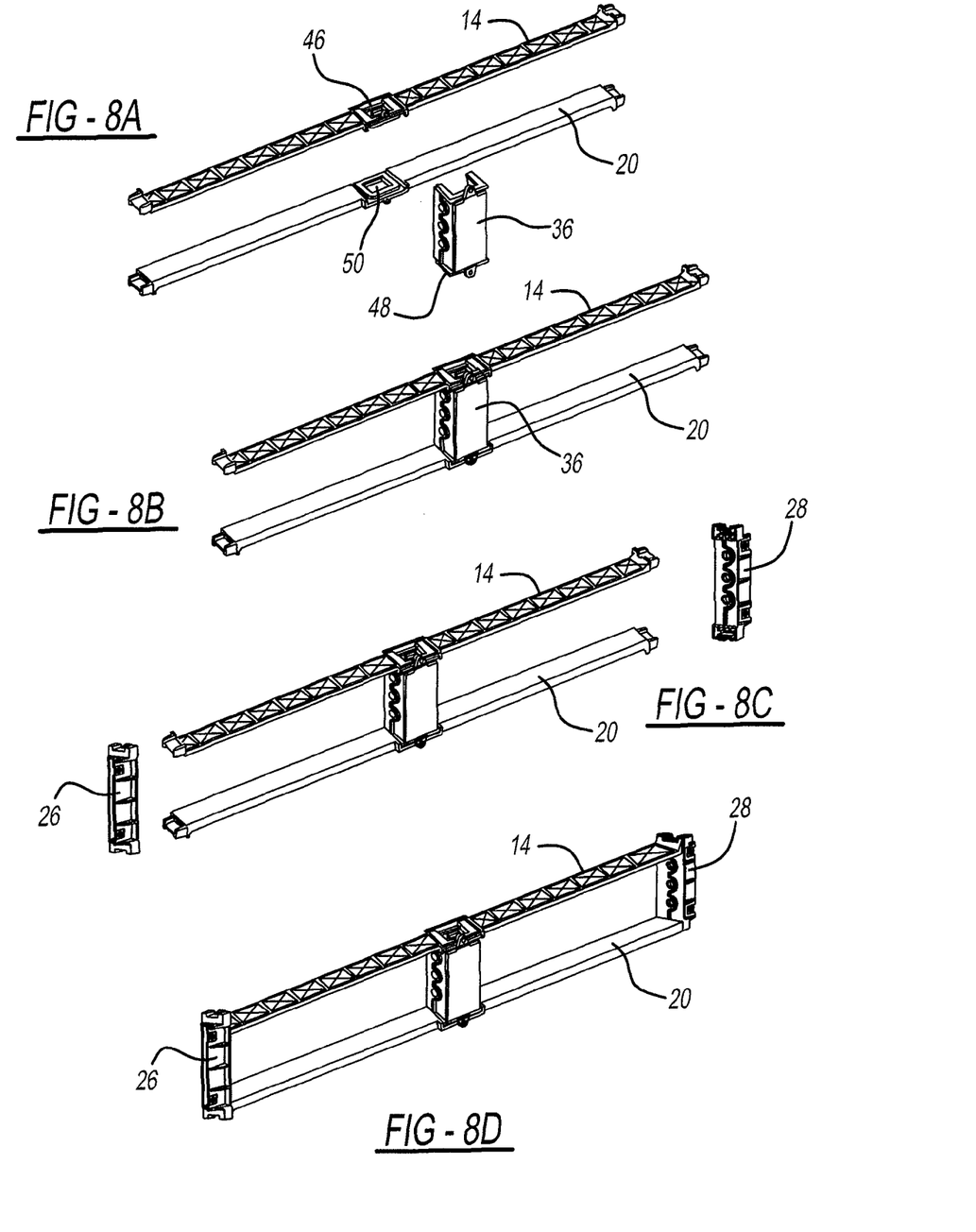
FIGS. 8A-8D are perspective views showing the assembly of the assembled modular frame.

The center bar 36 is has an upper end 44 that connects to an upper frame center joint 46 of the upper frame portion 14. A lower end 48 of the center bar 36 connects to a lower frame center joint 50 formed on the lower frame portion 20. The connection between both the upper end 44, upper frame center joint 46, lower end 48 and lower frames center joint 50 can be any type of suitable connection; however, the present invention provides an interlocking dovetail joint 52, which is best shown in FIGS. 8a and 8n. Each interlocking dovetail joint 52 has a protrusion 54 capable of sliding into a groove 56 for aligning and locking the center bar 36 to its respective upper frame portion 14 or lower frame portion 20. In order to lock the center bar 36 together with the upper frame portion 14 and lower frame portion 20. Each interlocking dovetail joint 52 also has a tab with a boss and fastener arrangement 58 for locking the interlocking dovetail joint 52 in place. It is within the scope of this invention for some type of locking tab or other molded locking mechanism to be used instead of the tab, boss and fastener arrangement 58.

Figure 1:
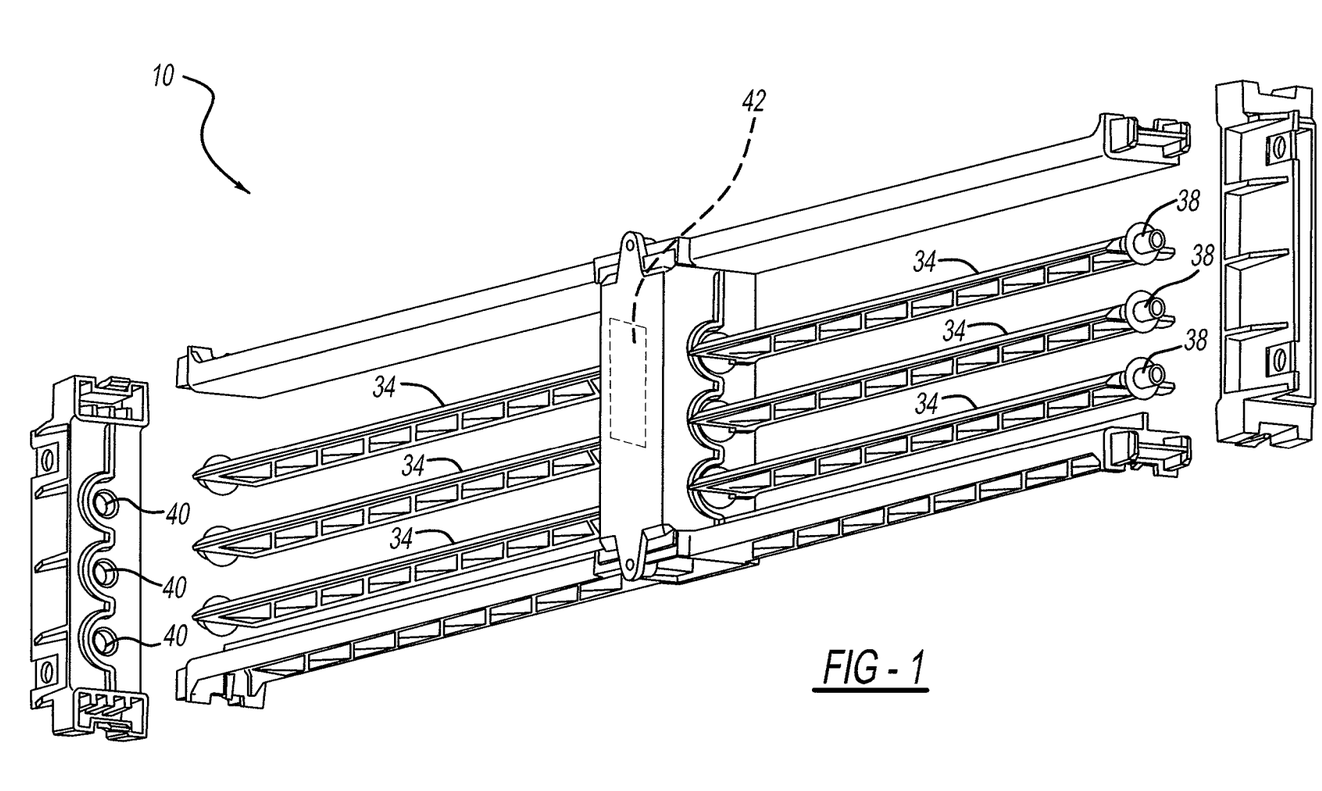
FIG. 1 is an exploded angled perspective view of an active grille shutter arrangement in accordance with the present invention.
Figure 2:
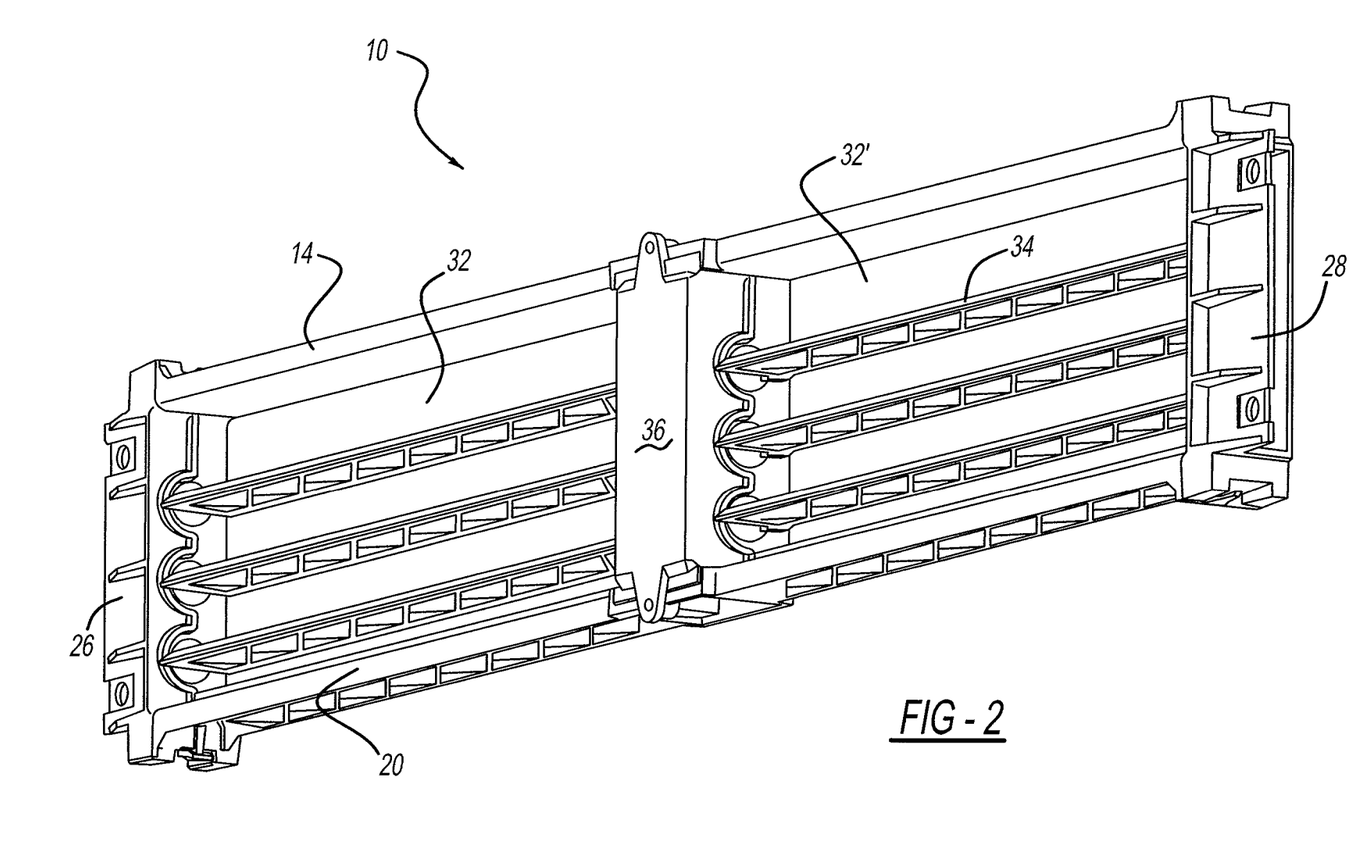
FIG. 2 is an angled perspective view of the active grille arrangement in accordance with the present invention.
Figures 3A, 3B:
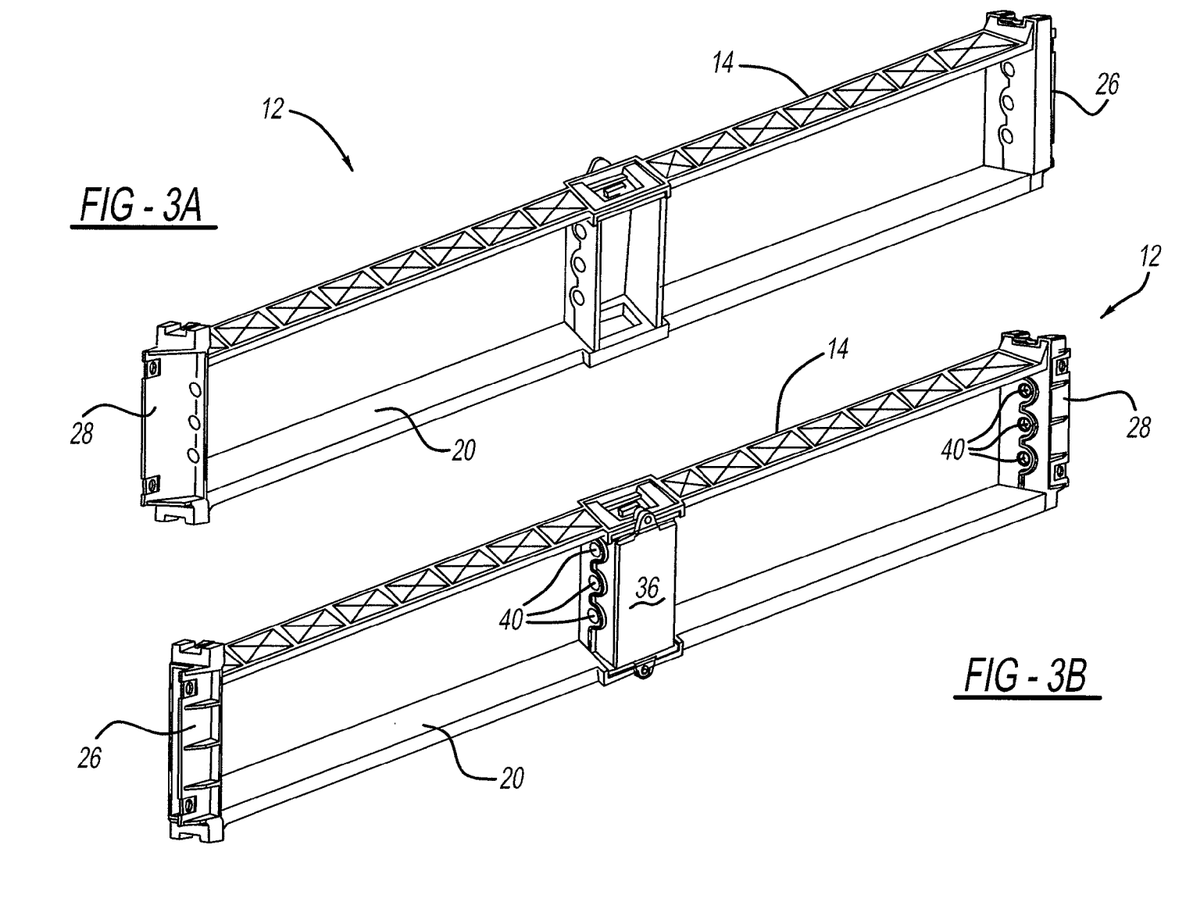
FIG. 3A is a front angled perspective view of the active grille arrangement in accordance with the present invention.
FIG. 3B is a rear angled perspective view of the active grille arrangement in accordance with the present invention.
Figure 4:
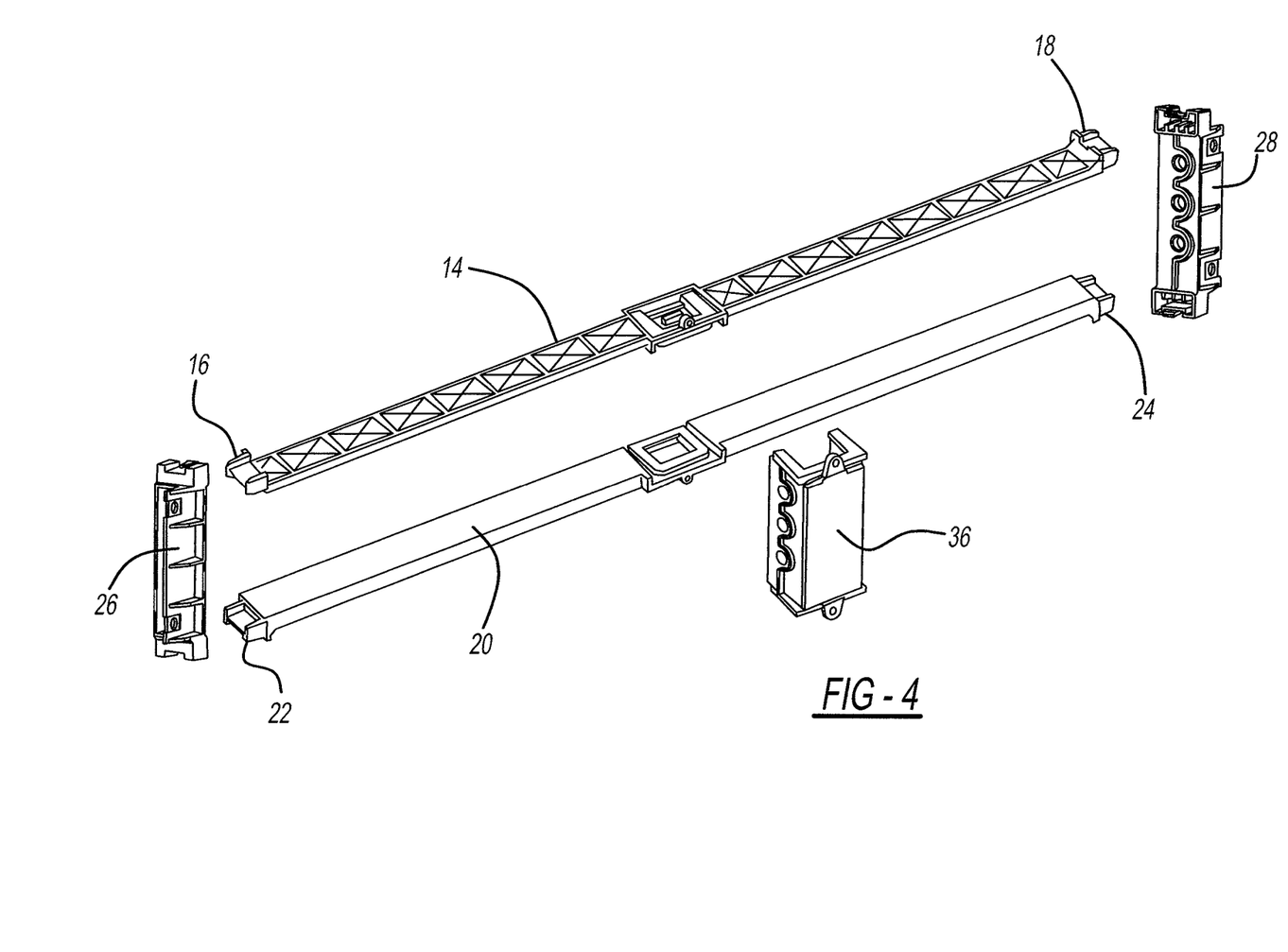
FIG. 4 is an exploded rear perspective view of the modular frame in accordance with the present invention.
Figure 5:
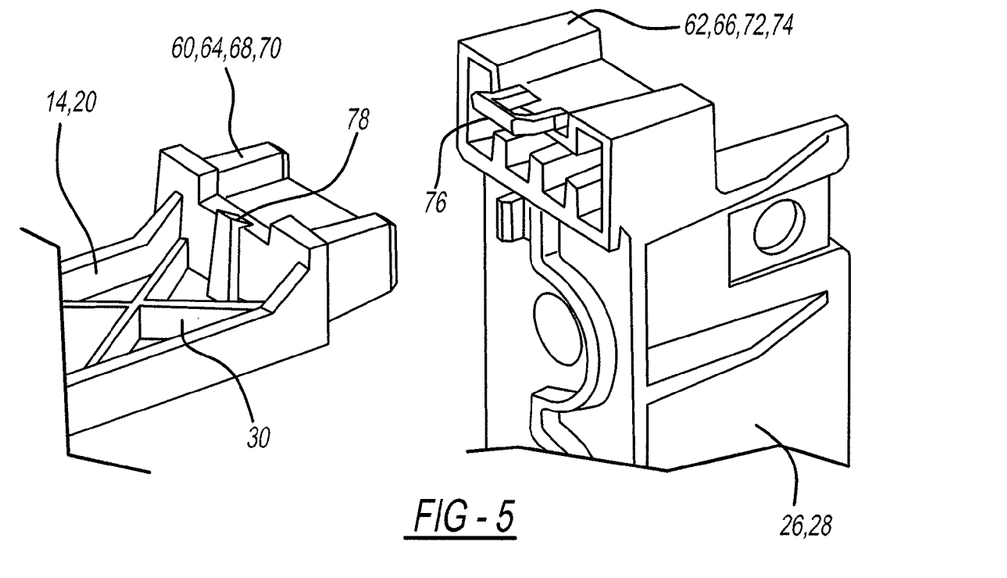
FIG. 5 is an enlarged perspective view of an end joint of the upper frame portion.
Figure 6:
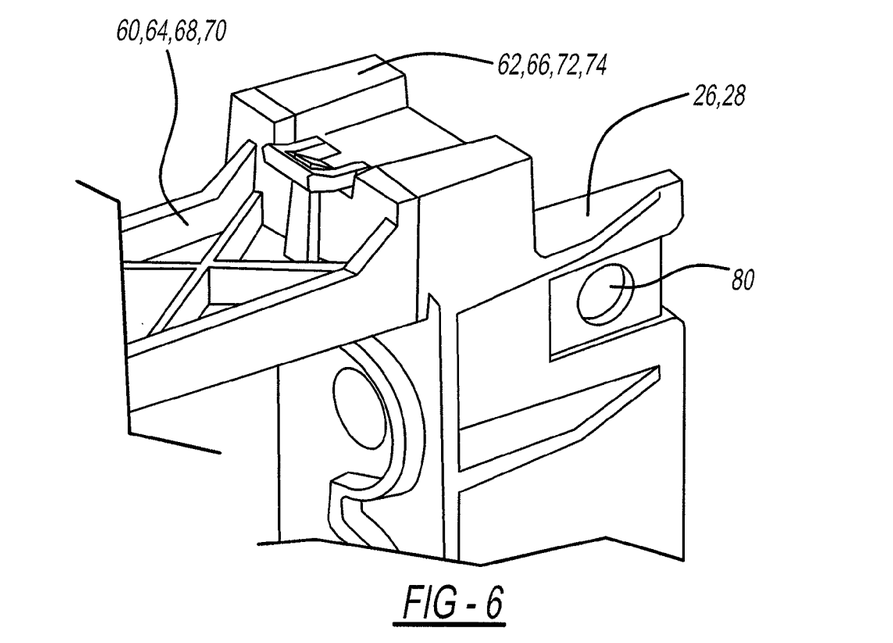
FIG. 6 is an enlarged perspective view of the assembled end joint and end cap joint in accordance with the present invention.
Figure 7A:
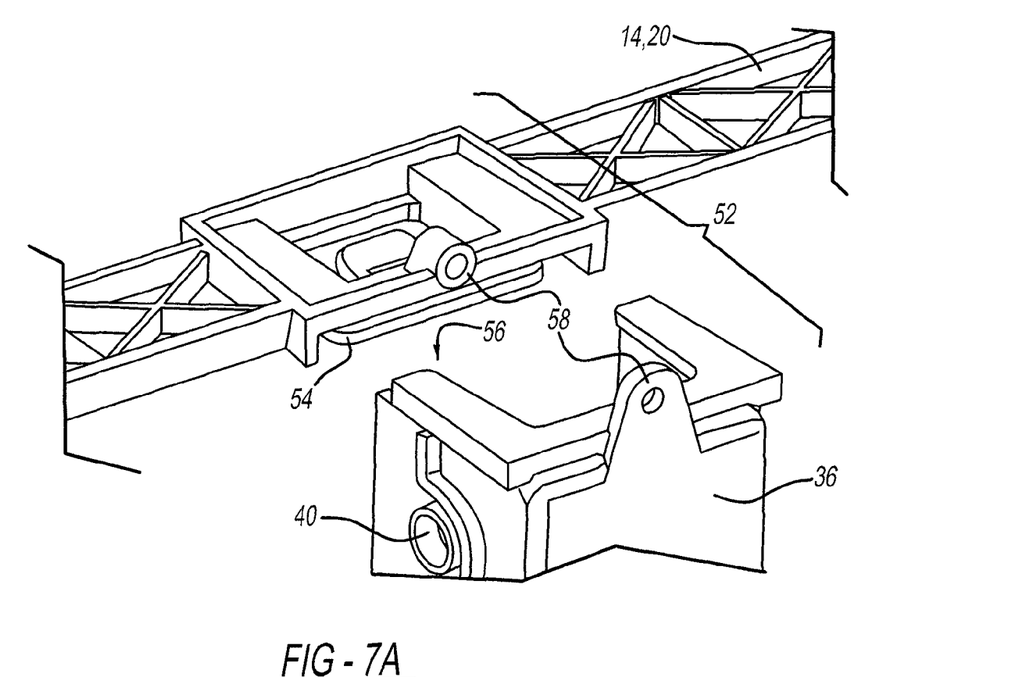
FIG. 7A is an exploded perspective angled view of an interlocking dovetail joint on the upper frame portion with the upper portion of the center bar exploded from the interlocking dovetail joint.
Figure 7B:
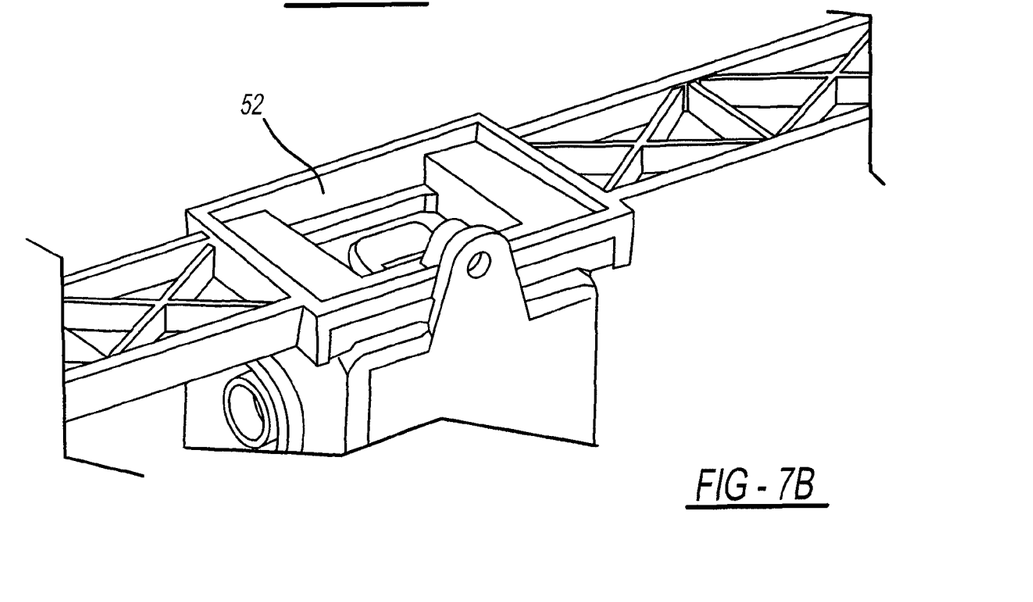
FIG. 7B is an enlarged perspective view of the center bar assembled to the interlocking dovetail joint of the upper frame portion.

Referring now to FIGS. 5 and 6, the connection between the first and second ends 16, 18 of the upper frame portion and the first and second ends of the lower frame portion 22, 24 with each respective first end cap 26 and second end cap 28 are shown. The first end 16 of the upper frame portion 14 has an upper bar end joint 60 formed thereon which is configured to slide into an upper bar end cap joint 62 formed on the first end cap 26. The first end 22 of the lower frame portion 20 has a lower bar end joint 64 formed thereon which slides into a lower bar end cap joint 66 of the first end cap 26. Similarly, the second end 18 of the upper frame portion 14 has an upper bar end joint 68 formed thereon and the second end 24 of the lower frame portion 20 has a lower bar end joint 70 formed thereon. The upper bar end joint 68 of the second end 18 of the upper frame portion 14 is configured to slide into an upper bar end cap joint 72 of the second end cap 28. Also, the lower bar end joint 70 on the second end 24 of the lower frame portion 20 slides into the lower bar end cap joint 74 of the second end cap 28. Once the upper frame portion 14 and lower frame portion 20 are connected to the first end cap 26 and second end cap 28 as described above, the assembled modular frame 12 is complete.

Referring again to FIGS. 5 and 6, is an exploded exemplary view of the connection between a respective one of the upper bar end joint 60, 68 or lower bar end joint 64, 70 with the respective upper bar end cap joints 62, 72 or lower bar end cap joints 66, 74. The upper bar end joint 60, 68 and lower bar end joint 64, 70 have show a protrusion that is configured to slide into a housing for receiving the protrusion as shown at the upper bar end cap joint 62, 72 and lower bar end cap joint 66, 74. In order to lock all the pieces together, an end cap snap tab 76 is used to lockingly receive a frame bar snap post 78. While the drawings of the present invention show the end cap snap tabs 76 as being formed on the lower bar end cap joint 66, 74 or upper bar end cap joint 62, 72 and the frame bar snap post 78 being formed on the upper bar end joint 60, 68 or lower bar end joint 64, 70, it is within the scope of the invention for the end cap snap tab 76 and frame bar snap post 78 to be reversed and on opposing structures. Additionally, it is possible for other suitable injection molded locking mechanisms to be used including tongue in groove type locks, as well as the use of adhesive or mechanical fasteners depending upon the needs of a particular application.

Referring now to FIGS. 1-8D, once the active grille shutter arrangement 10 has been fully assembled, the arrangement can be connected to a vehicle using body mounts 80 which are holes used for connecting the assembled modular frame 12 using fasteners. However, it is possible for other types of connection mechanisms to be used such as adhesives, welding or other needs depending on a particular application. It is also within the scope of this invention for the active grille shutter arrangement 10 to be connected to the vehicle chassis, front end module or the fascia of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grille shutter arrangement having an assembled modular frame comprising:
   an upper frame portion having a first end and a second end;
   a lower frame portion having a first end and a second end;
   a first end cap connectable to both the first end of the upper frame portion and the first end of the lower frame portion by an upper bar end joint formed on the first end of the upper frame portion and a lower bar end joint formed on the first end of the lower frame portion, wherein the upper bar end joint of the first end of the upper frame portion slides into an upper bar end cap joint formed on the first end cap and the lower bar end joint of the second end of the lower frame portion slides into a lower end cap joint formed on the first end cap;
   a second end cap connectable to both the second end of the upper frame portion and the second end of the lower frame portion by an upper bar end joint formed on the second end of the upper frame portion and a lower bar end joint formed on the second end of the lower frame portion, wherein the upper bar end joint of the second end of the upper frame portion slides into an upper end cap joint formed on the second end cap and the lower bar end joint formed on the second end of the lower frame portion slides into a lower end cap joint formed on the second end cap;
   the assembled modular frame of the active grille shutter arrangement formed by the connection of the upper frame portion and lower frame portion each connected to the first end cap and the second end cap, wherein the assembled modular frame defines one or more apertures;
   a plurality of vanes rotatably positioned between the first end cap and the second end cap for controlling the amount of air flowing through the one or more apertures formed by the assembled modular frame;
   a center bar extending between the upper frame portion and the lower frame portion;
   wherein each one of the plurality of vanes has two ends with barrels formed on each of the two ends;
   holes formed on the center bar, first end cap and second end cap, wherein said holes rotatively receive one of said barrels of one of said plurality of vanes.

2. The active grille shutter arrangement of claim 1 further comprising a center bar extending between the upper frame portion and the lower frame portion, wherein the center bar has an upper end connected to an upper frame center joint formed on the upper frame portion between the first end and the second end of the upper frame portion;
   a lower end of the center bar connected to the lower frame portion at a lower frame center joint formed on the lower frame portion between the first end and the second end of the lower frame portion.

3. The active grille shutter arrangement of claim 2 wherein the connection between the upper end of the center bar and the lower end of the center bar is an interlocking dovetail joint secured with a tab and boss connected together with a fastener when the tab and boss are aligned.

4. The active grille shutter arrangement of claim 2 further comprising an actuator inside of said center bar that controls the rotatable position of the plurality of vanes.

5. The active grille shutter arrangement of claim 1 further comprising:
   an end cap snap tab and snap post connection between each one of the following:
      the first end of the upper frame portion and the first end cap;
      the first end of the lower frame portion and the first end cap;
      the second end of the upper frame portion and the second end cap; and
      the second end of the lower frame portion and the second end cap.

6. The active grille shutter arrangement of claim 1, wherein the assembled modular frame further comprises body mounts formed on the assembled modular frame for connecting the assembled modular frame to a vehicle.

7. An active grille shutter arrangement having an assembled modular frame comprising:
   an upper frame portion having a first end and a second end;
   a lower frame portion having a first end and a second end;
   a first end cap connectable to both the first end of the upper frame portion and the first end of the lower frame portion by an upper bar end joint formed on the first end of the upper frame portion and a lower bar end joint formed on the first end of the lower frame portion, wherein the upper bar end joint of the first end of the upper frame portion slides into an upper bar end cap joint formed on the first end cap and the lower bar end joint of the second end of the lower frame portion slides into a lower end cap joint formed on the first end cap;
   a second end cap connectable to both the second end of the upper frame portion and the second end of the lower frame portion by an upper bar end joint formed on the second end of the upper frame portion and a lower bar end joint formed on the second end of the lower frame portion, wherein the upper bar end joint of the second end of the upper frame portion slides into an upper end cap joint formed on the second end cap and the lower bar end joint formed on the second end of the lower frame portion slides into a lower end cap joint formed on the second end cap;
   the assembled modular frame of the active grille shutter arrangement formed by the connection of the upper frame portion and lower frame portion each connected to the first end cap and the second end cap, wherein the assembled modular frame defines one or more apertures;
   a plurality of vanes rotatably positioned between the first end cap and the second end cap for controlling the amount of air flowing through the one or more apertures formed by the assembled modular frame;
   a center bar extending between the upper frame portion and the lower frame portion, wherein the center bar has an upper end connected to an upper frame center joint formed on the upper frame portion between the first end and the second end of the upper frame portion.

8. The active grille shutter arrangement of claim 7 further comprising an actuator inside of said center bar that controls the rotatable position of plurality of vanes.

9. The active grille shutter arrangement of claim 7, wherein the center bar has an upper end connected to an upper frame center joint formed on the upper frame portion between the first end and the second end of the upper frame portion.

10. The active grille shutter arrangement of claim 7 further comprising a lower end of the center bar connected to the lower frame portion at a lower frame center joint formed on the lower frame portion between the first end and the second end of the lower frame portion.

11. The active grille shutter arrangement of claim 10 wherein the connection between the upper end of the center bar and the lower end of the center bar is an interlocking dovetail joint secured with a tab and boss connected together with a fastener when the tab and boss are aligned.

12. The active grille shutter arrangement of claim 7 further comprising an end cap snap tab and snap post connection between each one of the following:
   the first end of the upper frame portion and the first end cap;
   the first end of the lower frame portion and the first end cap;
   the second end of the upper frame portion and the second end cap; and
   the second end of the lower frame portion and the second end cap.

13. The active grille shutter arrangement of claim 7 further comprising body mounts formed on the assembled modular frame for connecting the assembled modular frame to a vehicle.

\* \* \* \* \*